2,831,011
METHOD OF REACTING SILANES WITH ETHERS

Leo H. Sommer, State College, Pa., assignor to Dow Corning Corporation, Midland, Mich., a corporation of Michigan No Drawing. Application December 22, 1954
Serial No. 477,114

6 Claims. (Cl. 260—448.8)

This invention relates to the reaction of hydrogen containing organosilicon compounds with organic ethers.

It is the object of this invention to provide a novel method of cleaving organic ethers by reacting them with organosilicon hydrides. Another object is to provide a novel manner for preparing hydrocarbonoxy substituted organosilicon compounds. Another object is to provide a way of converting organic molecules containing ether linkages into alcohols. Other objects and advantages will be apparent from the following description.

In accordance with this invention an organosilicon compound containing silicon bonded hydrogen is reacted with an organic ether in the presence of finely divided nickel.

The reaction of this invention is produced by merely bringing the silane and the ether together in the presence of the catalyst. Preferably the reaction mixture should be heated in order to hasten the rate of the reaction. If desired, the reaction may be carried out in the presence of inactive solvents such as aromatic or aliphatic hydrocarbons. The reaction proceeds smoothly at the reflux temperature of the solvent. With volatile ethers such as dimethyl or diethyl ether it is advantageous to employ pressure.

The reaction of this invention can be carried out with any organosilicon compound having at least 1 hydrogen atom attached to at least some of the silicon atoms and in which the remaining valences of the silicon are satisfied by hydrocarbon radicals, halogenated hydrocarbon radicals, hydrocarbonoxy radicals, halogenated hydrocarbonoxy radicals or by oxygen atoms. Thus the types of organosilicon compounds which are operative herein are silanes of the formula $R_aSiH_b$ in which $a$ has a value from 0 to 3, $b$ has a value from 1 to 4 and R is a monovalent hydrocarbon radical, a halogenated monovalent hydrocarbon radical, a hydrocarbonoxy radical or a halogenated hydrocarbonoxy radical and siloxanes of the unit formula

$$R_cH_dSiO_{\frac{4-c-d}{2}}$$

in which R is as above defined, $c$ has a value from 0 to 2 and $d$ has a value from 1 to 3 inclusive. In addition the process of this invention is operative with copolymers of siloxanes of the unit formula above shown and siloxanes of the unit formula

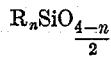

$$R_nSiO_{\frac{4-n}{2}}$$

in which R is as above defined and $n$ has a value from 0 to 3.

Thus specific examples of organosilicon compounds which are operative herein are silanes such as methyldiethoxysilane, phenyldiphenoxysilane, dibutylallyloxysilane, trimethylsilane, diethylsilane, octadecylmethylsilane, monomethylsilane, phenylsilane, diphenylsilane, tolylsilane, benzylmethylsilane, vinylmethylsilane, chlorophenylsilane, α,α,α-trifluorotolylmethylsilane, trifluorovinylmethylsilane and tetrafluoroethylsilane; and siloxanes such as methylhydrogensiloxane, disiloxane, tetramethyldisiloxane, pentaphenyldisiloxane, and copolymers of dimethylsiloxane, trimethylsiloxane and methylhydrogensiloxane; copolymers of phenylhydrogensiloxane, phenylmethylsiloxane and trimethylsiloxane; copolymers of monophenylsiloxane, octadecylmethylsiloxane and ethylhydrogensiloxane and copolymers of chlorophenylmethylsiloxane, cyclohexylsiloxane and octadecylhydrogensiloxane.

The organosilicon compounds employed herein also include compounds in which some or all of the silicon atoms are linked through polyvalent hydrocarbon or halogenated polyvalent hydrocarbon radicals such as for example, methylene, butylene, phenylene, —CH=CH—, —C≡C—,

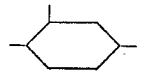

chlorophenylene, and cyclohexylene.

Both organic monoethers and organic polyethers are operative in the process of this invention. Specific examples of monoethers are aliphatic ethers such as diethylether, dibutylether, methylethylether, vinyloctadecylether; cycloaliphatic ethers such as cyclohexylbutylether; aromatic ethers such as diphenylether, ditolylether, phenylethylether; and cyclic ethers such as tetrahydrofuran and furan. Specific examples of polyethers are the diethylether of tripropylene glycol, the dimethylether of tetrapropylene glycol and the dimethylether of ethylene glycol.

The catalysts employed in this invention is finely divided nickel. The preferred form of the catalyst is the so-called Raney nickel which is prepared by dissolving the aluminum out of an alloy of 30% nickel and 70% aluminum.

The reaction of this invention may be represented by the schematic equation

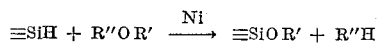

$$\equiv\text{SiH} + \text{R}''\text{OR}' \xrightarrow{\text{Ni}} \equiv\text{SiOR}' + \text{R}''\text{H}$$

This reaction can be employed advantageously to replace ether groups in an organic compound with hydroxyl groups. For example, the hydrocarbonoxysilane which is formed can be hydrolyzed to regenerate an alcohol, thus giving R'OH. The reaction of this invention may also be advantageously employed to introduce solubilizing groups into a siloxane. For example, polymeric polyethers such as the polyalkalene oxides are water soluble thus these materials can be reacted with a hydrogen-containing siloxane in accordance with this invention thereby introducing a solubilizing polyether group at each point where the hydrogen was attached in the siloxane molecule (i. e. $\equiv\text{SiH} + \text{R}(\text{OR}')_x\text{OR} \rightarrow \equiv\text{SiO}(\text{R}'\text{O})_x\text{OR} + \text{RH}$ The following examples are illustrative only and are not to be construed as limiting the invention which is properly delineated in the appended claim.

EXAMPLE 1

72 g. of tetrahydrofuran, 11.6 g. of triethylsilane and 15.8 g. of Raney nickel were mixed in dry benzene. The mixture was refluxed overnight and the contents filtered. The solids were rinsed with pentane. Upon distillation there was obtained butoxytriethylsilane in 56% yield.

EXAMPLE 2

Using the procedure of Example 1 the following reactions were carried out. The results are shown in the table below.

Table

| Silicon Compound | Amount in g. | Ether | Amount in g. | Reaction time in hours | Product | Percent Yield |
|---|---|---|---|---|---|---|
| Triethylsilane | 11.6 | anisole | 108 | 3 | Triethylphenoxysilane | 78 |
| Do | 11.6 | dibutylether | 130 | 12 | Triethylbutoxysilane | 10 |
| Do | 10.2 | n-butyl-sec-butylether | 13.8 | 48 | Mixed butoxytriethylsilanes | 51 |
| 3-H-heptamethyltrisiloxane | 22.2 | anisole | 21.3 | 48 | 3-phenoxyheptamethyltrisiloxane | 24 |

EXAMPLE 3

When one mol of methyldiethoxysilane is reacted with one mol of bis,2-chloroethylether in accordance with the procedure of Example 1, the compound methyldiethoxy,2-chloroethoxysilane is obtained.

EXAMPLE 4

When 1 mol of diethoxysilane is reacted with 2 mols of dibutylether in accordance with the method of Example 1, the compound diethoxydibutoxysilane is obtained.

EXAMPLE 5

When 1 mol of disiloxane is reacted with 6 mols of diphenylether in accordance with the procedure of Example 1, hexaphenoxydisiloxane is obtained.

EXAMPLE 6

When 1 mol of $Me_2HSiCH_2SiHMe_2$ is reacted with two mols of anisole in accordance with the procedure of Example 1, the compound $Me_2(PhO)SiCH_2Si(OPh)Me_2$ is obtained.

EXAMPLE 7

When a copolymer of $Me_3SiO_{.5}$, $Me_2SiO$ and $MeHSiO$ is reacted with $MeO(C_2H_4O)_8Me$ in accordance with the procedure of Example 1, a copolyer of $Me_3SiO_{.5}$, $Me_2SiO$ and

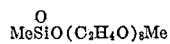

is obtained.

EXAMPLE 8

When methylethylchlorophenoxysilane is reacted with anisole in the manner of Example 1, the compound methyl ethyl chlorophenoxy phenoxy silane is obtained.

That which is claimed is:

1. The method which comprises reacting in a liquid phase an organosilicon compound having at least one hydrogen atom attached to at least one of the silicon atoms, the remaining valences of the silicon atoms being satisfied by radicals selected from the group consisting of hydrocarbon, halogenated hydrocarbon, hydrocarbonoxy, halogenated hydrocarbonoxy radicals and oxygen atoms, with an organic ether free of aliphatic unsaturation, said reactants being in contact with finely divided nickel.

2. The method which comprises reacting in a liquid phase an organosilicon compound having at least one hydrogen atom attached to at least one of the silicon atoms, the remaining valences of the silicon atoms being satisfied by radicals selected from the group consisting of hydrocarbon, halogenated hydrocarbon, hydrocarbonoxy, and halogenated hydrocarbonoxy radicals and oxygen atoms, with an organic ether free of aliphatic unsaturation selected from the group consisting of cyclic hydrocarbon ethers, ethers of the formula $ROR''$, and ethers of the formula $R(OR')_xOR''$, where $x$ is any positive integer, R and R'' are selected from the group consisting of monovalent hydrocarbon radicals and halogenated monovalent hydrocarbon radicals, and R' is a divalent hydrocarbon radical, said reactants being in contact with finely divided nickel.

3. The method which comprises reacting in a liquid phase an organosilicon compound having at least one hydrogen atom attached to at least one of the silicon atoms, the remaining valences of the silicon atoms being satisfied by radicals selected from the group consisting of hydrocarbon, halogenated hydrocarbon, hydrocarbonoxy, and halogenated hydrocarbonoxy radicals and oxygen atoms, with a hydrocarbon ether free of aliphatic unsaturation, said reactants being in contact with finely divided nickel and the reaction being carried out at a temperature below that at which any thermal decomposition of the reactants takes place.

4. The method which comprises reacting in a liquid phase an organosilicon compound having at least one hydrogen atom attached to at least one of the silicon atoms, the remaining valences of the silicon atoms being satisfied by radicals selected from the group consisting of hydrocarbon, halogenated hydrocarbon, hydrocarbonoxy, and halogenated hydrocarbonoxy radicals and oxygen atoms, with an aliphatic hydrocarbon ether free of aliphatic unsaturation, said reactants being in contact with finely divided nickel.

5. The method which comprises reacting in a liquid phase an organosilicon compound having at least one hydrogen atom attached to at least one of the silicon atoms, the remaining valences of the silicon atoms being satisfied by radicals selected from the group consisting of hydrocarbon, halogenated hydrocarbon, hydrocarbonoxy, and halogenated hydrocarbonoxy radicals and oxygen atoms, with an aromatic hydrocarbon ether free of aliphatic unsaturation, said reactants being in contact with finely divided nickel.

6. The method which comprises reacting in a liquid phase an organosilicon compound having at least one hydrogen atom attached to at least one of the silicon atoms, the remaining valences of the silicon atoms being satisfied by radicals selected from the group consisting of hydrocarbon, halogenated hydrocarbon, hydrocarbonoxy, and halogenated hydrocarbonoxy radicals and oxygen atoms, with a hydrocarbon polyether free of aliphatic unsaturation, said reactants being in contact with finely divided nickel.

References Cited in the file of this patent

FOREIGN PATENTS

| 684,597 | Great Britain | Dec. 24, 1952 |
| 916,529 | Germany | Aug. 12, 1954 |
| 1,054,055 | France | Feb. 8, 1954 |